V. LAPHAM.
MEAT TENDERER.

No. 189,237. Patented April 3, 1877.

WITNESSES
Henry N. Miller
C. L. Evert

INVENTOR
Valentine Lapham
Alexander Mason
ATTORNEYS

UNITED STATES PATENT OFFICE.

VALENTINE LAPHAM, OF MARION, OHIO.

IMPROVEMENT IN MEAT-TENDERERS.

Specification forming part of Letters Patent No. 189,237, dated April 3, 1877; application filed September 23, 1876.

*To all whom it may concern:*

Be it known that I, VALENTINE LAPHAM, of Marion, in the county of Marion, and in the State of Ohio, have invented certain new and useful Improvements in Device for Mangling Meats; and do hereby declare that the following is a full, clear, and exact description thereof, reference being had to the accompanying drawings, and to the letters of reference marked thereon, making a part of this specification.

The nature of my invention consists in the construction and arrangement of a beefsteak-mangler, as will be hereinafter more fully set forth.

In order to enable others skilled in the art to which my invention appertains to make and use the same, I will now proceed to describe its construction and operation, referring to the annexed drawing, in which—

Figure 1:
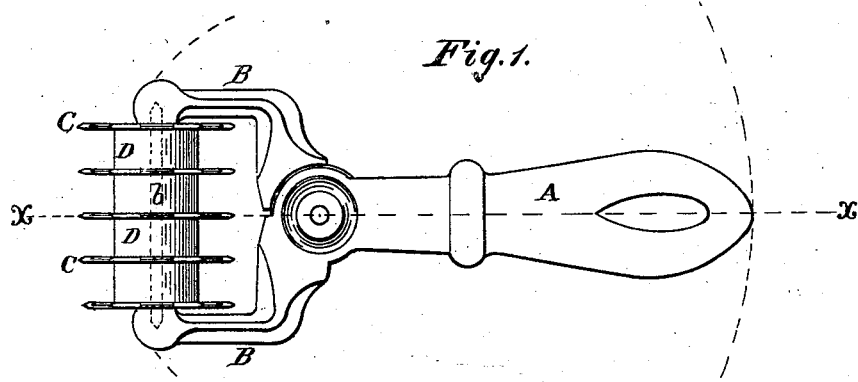
Figure 2:
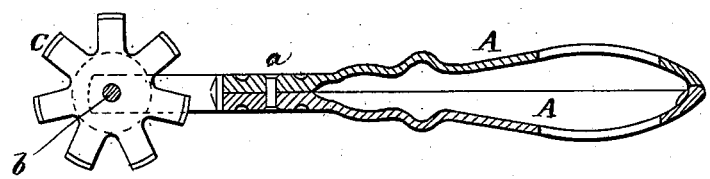
Figure 3:
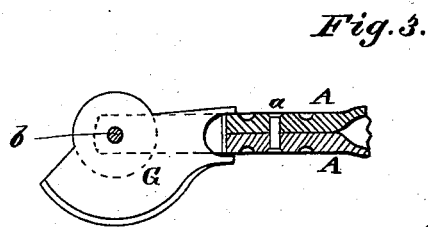
Figure 4:
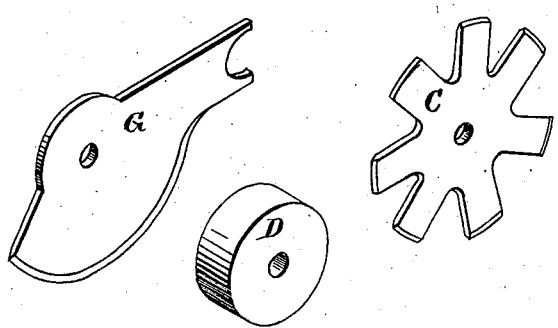

Figure 1 is a plan view of my invention. Fig. 2 is a longitudinal section of the same. Figs. 3 and 4 are detached views of parts thereof.

The handle of my meat-mangler is made in two parts, A A, placed one on top of the other, and riveted at *a*, so as to be capable of turning.

From the pivot-point *a* each part of the handle is extended to form an L-shaped jaw, B. When the handle is closed, as shown in the drawing, the two arms of the jaws B B stand parallel with each other, and in their outer ends is held a rod or pin, *b*. On this rod are placed a number of star-shaped knives or cutters, C C, with washers or collars D D between them. These knives or cutters may be of any desired number, and have any desired number of arms.

The device thus constructed is to be held in one hand, and with sufficient pressure the knives are to be rolled over the meat to cut the fibers thereof.

Instead of rolling knives C, drawing-knives G, constructed as shown in Figs. 3 and 4, may be used, which knives are simply to be drawn over the meat.

In either case it is only necessary to open the handle, when the rod *a* falls out and the knives can easily be slipped off to be cleaned, and, when necessary, sharpened.

Having thus fully described my invention, what I claim as new, and desire to secure by Letters Patent, is—

In a meat-mangler, the handle made in two parts, pivoted together, and provided with L-shaped jaws, in combination with a rod, *b*, rolling or drawing knives, and intermediate washers or collars, substantially as and for the purposes herein set forth.

In testimony that I claim the foregoing I have hereunto set my hand this 5th day of September, 1876.

VALENTINE LAPHAM.

Witnesses:
JOHN F. MCNEAL,
PHILIP DOMBAUGH.